No. 684,397. Patented Oct. 15, 1901.
H. H. ADAMS.
GALLOPING HORSE AND SULKY.
(Application filed Jan. 2, 1901.)
(No Model.)
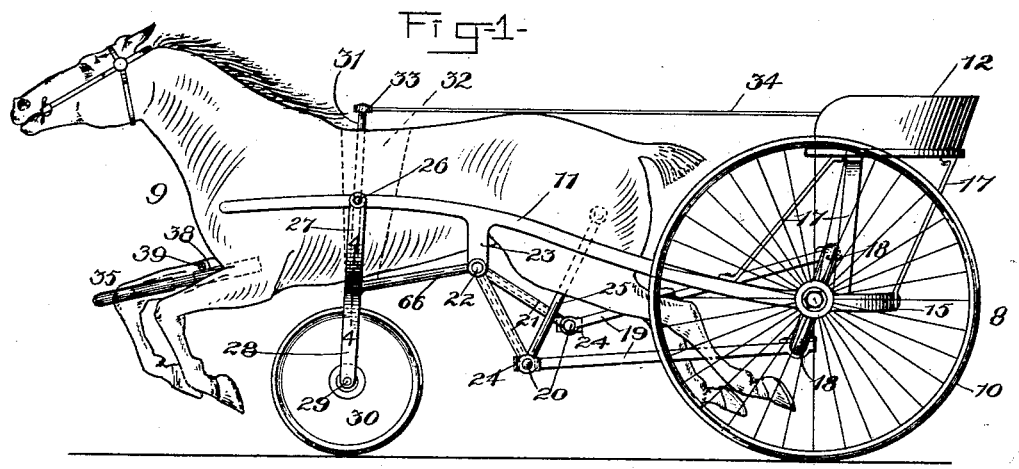

UNITED STATES PATENT OFFICE.

HANSON H. ADAMS, OF EVERETT, MASSACHUSETTS.

GALLOPING HORSE AND SULKY.

SPECIFICATION forming part of Letters Patent No. 684,397, dated October 15, 1901.

Application filed January 2, 1901. Serial No. 41,789. (No model.)

*To all whom it may concern:*

Be it known that I, HANSON H. ADAMS, a citizen of the United States, residing at Everett, in the county of Middlesex and State of Massachusetts, have invented new and useful Improvements in Galloping Horses and Sulkies, of which the following is a specification.

The object of this invention is to produce a toy horse and carriage in which the carriage is propelled by the child or person seated therein and the horse is driven or guided by the driver by means of reins, and at the same time said horse is rocked upon a pivot to represent a galloping motion.

The invention consists in the combination and arrangement of parts set forth in the following specification, and particularly pointed out in the claims thereof.

Referring to the drawings, Figure 1 is a side elevation of my improved "galloping horse and sulky." Fig. 2 is a plan view of the sulky and actuating mechanism with the horse and seat removed, the latter being indicated by dotted lines. Fig. 3 is a front elevation of the same. Fig. 4 is a detail section, line 4 4, Fig. 1. Fig. 5 is a detail plan view of a front guard to prevent the horse from being injured.

Like numerals refer to like parts throughout the several views of the drawings.

In the drawings, Figs. 1, 2, and 3, 8 is the carriage of the two-wheeled variety known as a "sulky." 9 is the horse; 10, the wheels; 11, the shafts, and 12 the seat of said carriage. One of the wheels 10 is fast to the axle 13 of the carriage and turns with it and the other wheel is preferably loose upon the axle 13. Said axle turns in bearings 14 in the body 15, said body being in this particular form a continuation of and in one piece with the shafts 11. The shafts 11 are prevented from sliding lengthwise of the axle 13 by two collars 16, fastened to said axle. The seat 12 is supported upon braces 17, fast at the lower ends thereof to the body 15. The axle 13 is rotated by two cranks 18 formed thereon. Said cranks have a rotary motion imparted to them by connecting-rods 19, which connect said cranks to shafts 20 in the free ends of the treadle-levers 21. The treadle-levers 21 are pivoted to rock upon a stationary shaft 22. Said shaft is supported by and fast to the downwardly-projecting ears 23, said ears being formed upon or fast to the shafts 11. Each of the treadle-levers 21 has a pedal 24, journaled to the stationary shaft 20 thereon, and one of said treadle-levers is connected to the rear portion of the horse 9 by a connecting-rod 25.

The horse 9 is pivotally supported upon two pins 26, one at each side thereof. Said pins are fast to the upper ends of a yoke 27. Said yoke is made in one piece and is connected by braces 66 to the stationary shaft 22. The forks 28 are supported upon the shaft 29 of a swivel-wheel 30. A vertical steering-rod 31, fast to the forks 28, passes upwardly therefrom through a bearing 40 in the yoke 27 and a slot 32 in the horse and has a cross-bar 33, fast to the upper end thereof. Reins 34 are attached to the cross-bar 33 and extend therefrom to the seat 12, where they are held and manipulated by the driver.

To the front or breast portion of the horse is affixed a guard-wire 35. Said guard-wire is covered with rubber and bent in a double loop at 36 36, and the free ends thereof are brought together and form a shank portion 37, which is inserted in a tube 38, driven into the breast portion of the horse and held in said tube by a set-screw 39, screw-threaded in said tube and bearing against said shank portion of the guard-wire, between the wires forming the same, thus holding said guard-wire firmly in position. The object of the guard-wire is to prevent the legs of the horse from being broken by coming in contact with furniture or other objects and also to prevent marring said furniture.

The operation of the device as a whole is as follows: The driver sits upon the seat 12 with his feet upon the pedals 24 and alternately depresses said pedals and the treadle-levers 21, to which they are attached. The treadle-levers 21 impart a rotary movement to the axle 13 through the connecting-rods 19, and the horse is tipped or rocked upon its pivotal pins 26 by the connection 25, which raises and lowers the rear end of the horse as the treadle-lever 21, to which it is connected, rises and falls. The driver turns the swivel-wheel 30 by pulling upon the reins 34 and turning the vertical rod 31 in its bearings 40, together with the forks and wheel made fast thereto.

It is preferable to drive the mechanism for rotating the axle 13 by foot-power; but said mechanism may be actuated by hand-power—as, for instance, the shaft 22 might be made to rock in bearings in the ears 23 and extended beyond said bearings at each end to receive a hand-lever fastened to each end of said shaft and extending upwardly therefrom to be within reach of the driver.

Having thus described my invention, what I claim, and desire to secure by Letters Patent, is—

1. A toy galloping horse and carriage comprising a pair of wheels, a crank-axle fast to one of said wheels, a U-shaped yoke fast to the shafts of said carriage and extending partly around and under said horse, a pin fast to the upper end of each of the arms of said yoke upon which pins said horse is pivoted, a pair of forks, a wheel arranged to rotate thereon, a vertical steering-rod fast to said forks and arranged to turn in a bearing in said yoke, said steering-rod and pivotal pins being located in the same vertical plane, and means for turning said steering-rod.

2. A toy galloping horse and carriage comprising a pair of wheels, a crank-axle fast to one of said wheels, a U-shaped yoke fast to the shafts of said carriage and extending partly around and under said horse, a pin fast to the upper end of each of the arms of said yoke upon which pins said horse is pivoted, a pair of forks, a wheel arranged to rotate thereon, a vertical steering-rod fast to said forks and arranged to turn in a bearing in said yoke, said steering-rod and pivotal pins being located in the same vertical plane, and means for turning said steering-rod; in combination with driving mechanism to rotate said axle and a connection from said driving mechanism to said horse, whereby the latter is rocked upon its pivotal pins.

In testimony whereof I have hereunto set my hand in presence of two subscribing witnesses.

HANSON H. ADAMS.

Witnesses:
CHARLES S. GOODING,
LOUIS A. JONES.